Oct. 7, 1952   W. P. SCHMITTER   2,612,786
TRANSMISSION
Filed March 13, 1950   4 Sheets-Sheet 1

INVENTOR.
Walter P. Schmitter
BY
Quarles & French
Attorneys

Oct. 7, 1952 W. P. SCHMITTER 2,612,786
TRANSMISSION
Filed March 13, 1950 4 Sheets-Sheet 2

INVENTOR.
Walter P. Schmitter
BY
Marles & French
Attorneys

Oct. 7, 1952   W. P. SCHMITTER   2,612,786
TRANSMISSION
Filed March 13, 1950   4 Sheets-Sheet 3
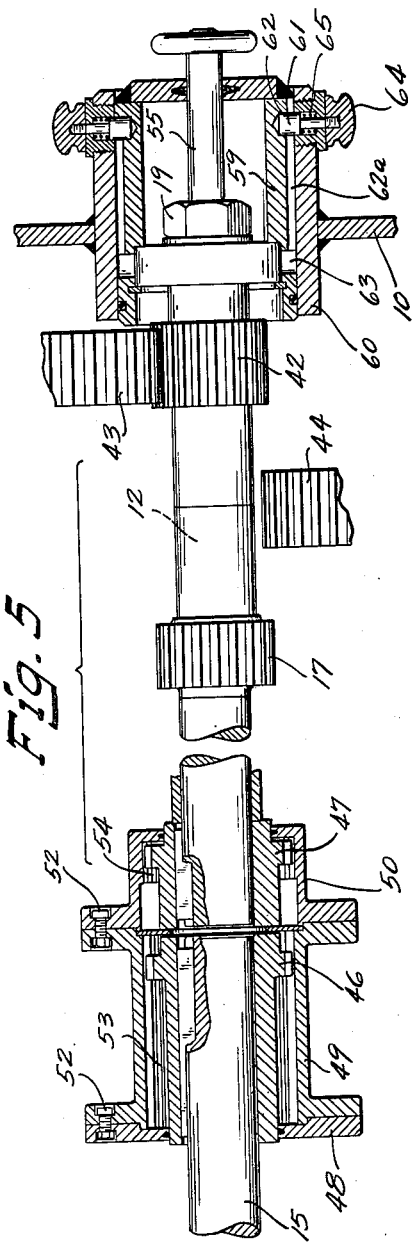
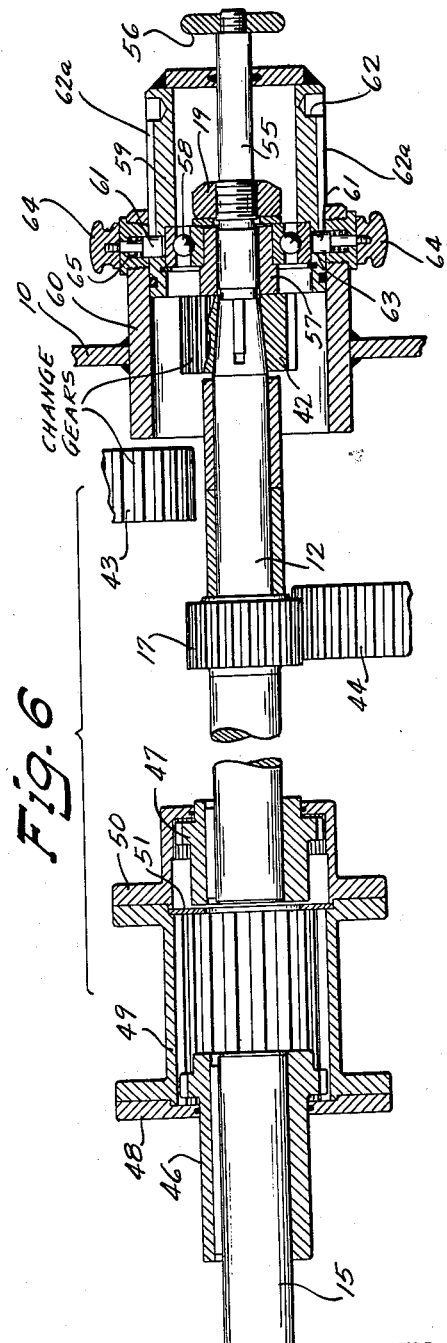
INVENTOR.
Walter P. Schmitter
BY Quarles & French
Attorneys Oct. 7, 1952 W. P. SCHMITTER 2,612,786
TRANSMISSION
Filed March 13, 1950 4 Sheets-Sheet 4
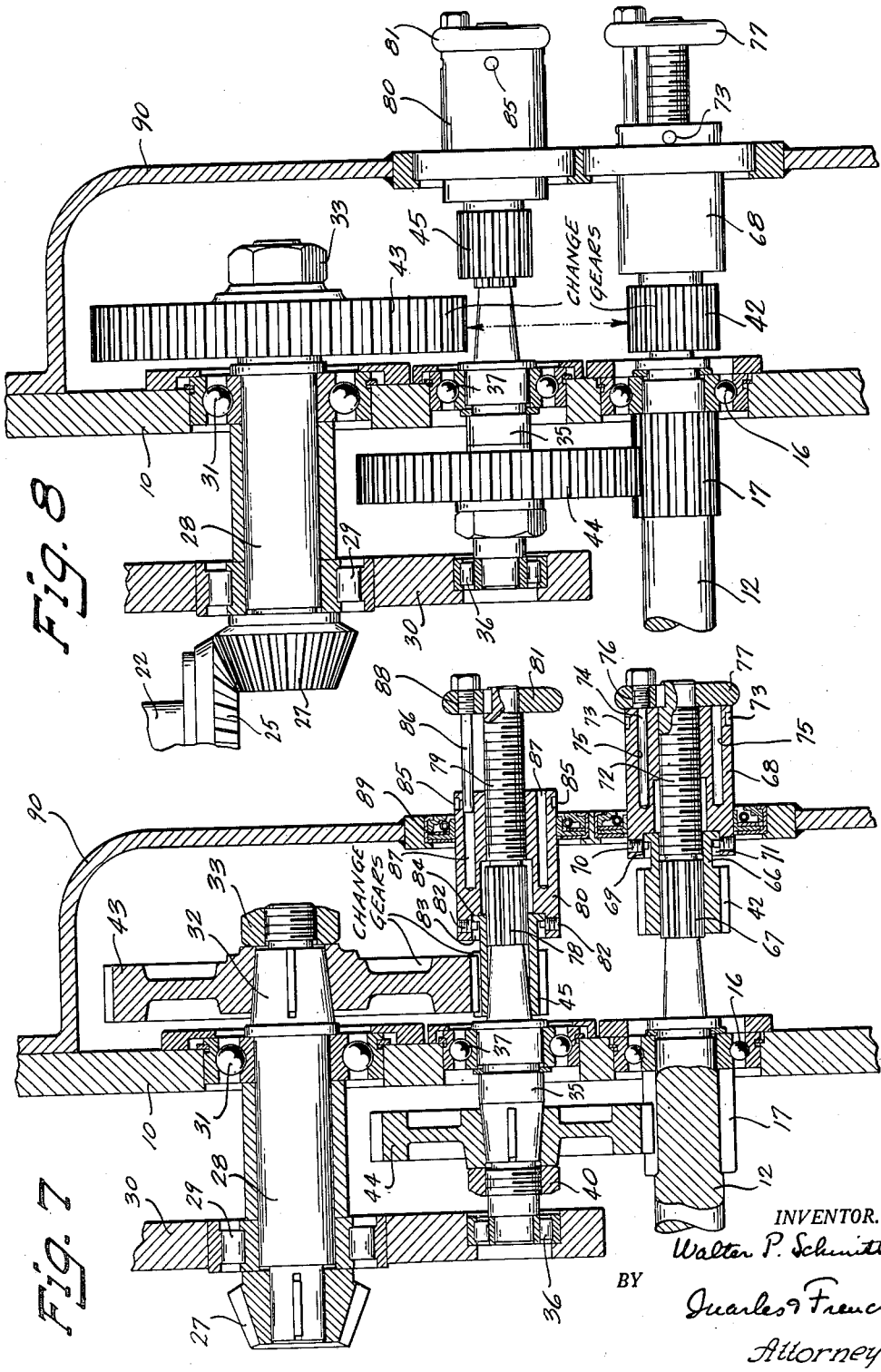
INVENTOR.
Walter P. Schmitter
BY
Quarles & French
Attorneys Patented Oct. 7, 1952

2,612,786

UNITED STATES PATENT OFFICE 2,612,786

TRANSMISSION

Walter P. Schmitter, Wauwatosa, Wis., assignor to The Falk Corporation, Milwaukee, Wis., a corporation of Wisconsin Application March 13, 1950, Serial No. 149,225

13 Claims. (Cl. 74—325)

1

The invention relates to geared transmission mechanism.

The main object of the invention is to provide a geared transmission mechanism for driving agitators, mixers, and the like at a predetermined speed and one in which the parts are so arranged that either a double reduction or a triple reduction may be had through shiftable gears, which gears form parts of change gears so that different speeds for any selected reduction may be obtained.

The invention further consists in the several features hereinafter set forth and more particularly defined by claims at the conclusion hereof.

In the drawings:

Fig. 5 is an enlarged sectional view of a portion of the shiftable drive shaft showing it positioned for double reduction;

Fig. 6 is a view similar to Fig. 5 showing the shiftable drive shaft positioned for triple reduction;

Fig. 7 is a vertical sectional developed view of a modified form of the invention showing the parts in triple reduction position;

Fig. 8 is a view similar to Fig. 7 showing the parts in double reduction position.

Figure 1:
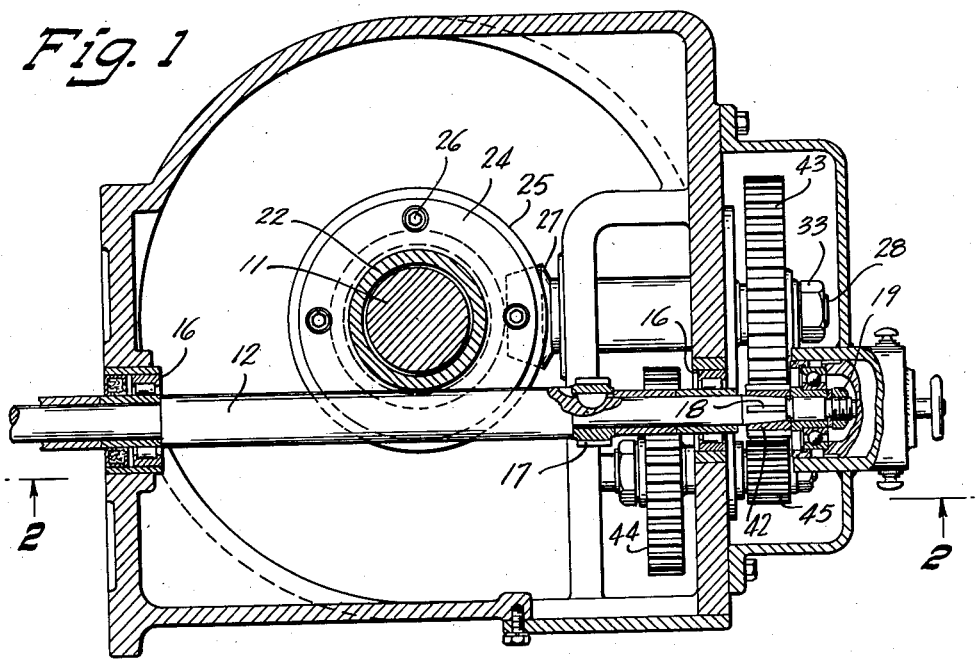
Fig. 1 is a horizontal sectional view through transmission mechanism embodying the invention taken on the line 1—1 of Fig. 2 showing the double reduction arrangement.
Figure 2:
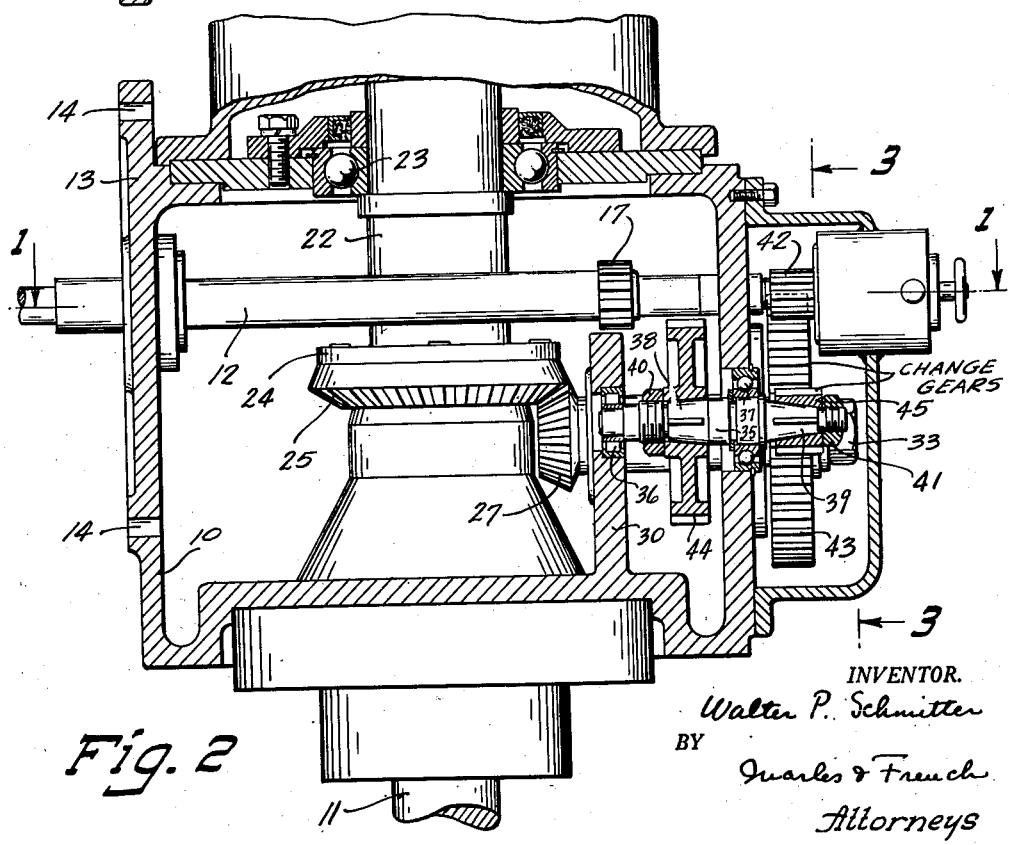
Fig. 2 is a vertical sectional view taken on the line 2—2 of Fig. 1.
Figure 3:
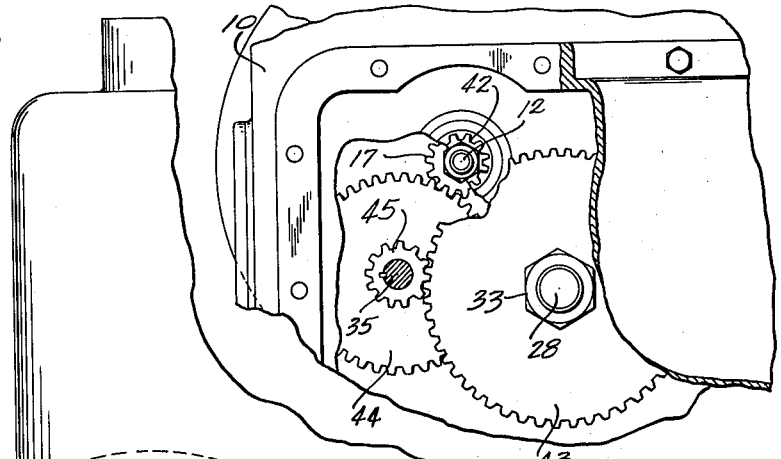
Fig. 3 is an elevation view of the transmission mechanism, parts being broken away and parts being shown in a section taken along the line 3—3 of Fig. 2.

Referring to Figs. 1, 2, and 3, the numeral 10 designates a housing having a vertically disposed driven shaft 11 journalled therein and a drive shaft 12 also journalled therein and extended at right angles to the shaft 11 and adjacent one side thereof.

The housing had a pad or base portion 13 formed on one side thereof on which an electric drive motor or its support may be mounted and secured by fastening means passing through the threaded holes 14 in said base portion and having its shaft coupled to the extended end of the drive shaft. In Figs. 5 and 6 the shaft 15 may be a part of the motor shaft.

The drive shaft 12 is journalled in a ball bearing 16 mounted on opposite sides of the housing 10 and has a pinion 17 formed integral therewith or secured thereto and a tapered outer end portion 18 for keyed attachment of a gear thereto secured by a nut 19 on the threaded end of said shaft.

The driven shaft 11 is suitably connected to a sleeve shaft 22 which is journalled in a ball bearing 23 at the top and a suitable bearing (not shown) mounted in the base of the housing 10, said shaft 22 having a flange 24 intermediate its ends to which a bevel gear 25 is secured by machine screws 26. The shafts 11 and 22 may be considered as a single shaft as they are coupled to each other and rotate as a unit. The gear 25 meshes with a bevel gear 27 mounted on a countershaft 28 which is parallel to the shaft 12 and whose axis is in the same plane as the axis of the shaft 11 but is disposed at right angles thereto. As shown in detail in Figs. 7 and 8, the shaft 28 at its front end is mounted in a roller bearing 29 in a partition 30 of the housing and at its rear end is mounted in ball bearing journal 31 in a side of the housing, and it has a tapered outer end portion 32 for keyed attachment of a gear thereto secured by a nut 33 on the threaded end 34 of said shaft.

An auxiliary or secondary countershaft 35 is mounted in bearings 36 and 37 in the partition 30 and housing 10, respectively, and it has tapered gear receiving portions 38 and 39 with clamping nuts 40 and 41 on the threaded portions of said shaft. The shaft 35 is parallel to the shafts 12 and 28 and is disposed below the shaft 12 and to one side of the shaft 28.

With the above arrangement of shafting either a double or triple gear reduction may be had from the shaft 11 or 22 to the shaft 12.

The drive shaft 12 in addition to the pinion 17 carries a gear or pinion 42 which is a change gear. In the form shown in Figs. 1 to 4 the drive shaft 12 is longitudinally movable or shiftable to effect either a meshing of the gear 42 with a change gear 43 on the shaft 28 for a double reduction or a meshing of the gear 17 with a gear 44 on the shaft 35 which carries a gear 45 meshing with the gear 43 on the shaft 28 for a triple reduction since in each instance one reduction is obtained through the bevel gears 25 and 27. The gear 45 is a change gear. Thus by the selection of different ratio change gears 45, 43, and 42 the speed of the driven shaft 22 for either a double or triple reduction may be changed.

Referring to Figs. 5 and 6, the means for effecting longitudinal movement of the drive shaft 12 and securing it in the desired set position is shown. The shaft 12 is secured in driving relation with the motor shaft 15 by a coupling including a three part housing, a gear 46 keyed to the shaft 15, and a gear 47 keyed to the shaft 12. The three part housing includes an end plate 48, an internally splined cylinder 49, a splined end cap 50, and an abutment ring 51, these parts being clamped together as a unit by screws 52. The gear 46 meshes with the splines 53 of the cylinder 49 and the gear 47 meshes with the splines 54 of the cap 50. The housing is moved on the longitudinal movement of the shaft 12 to the double reduction position by the end abutment of the gear 47 with the cap and to the triple reduction position by the end abutment of the hub of the gear 47 with the ring 51. For moving the shaft 12 an extension 55 carrying a hand wheel 56 is provided.

Figure 4:
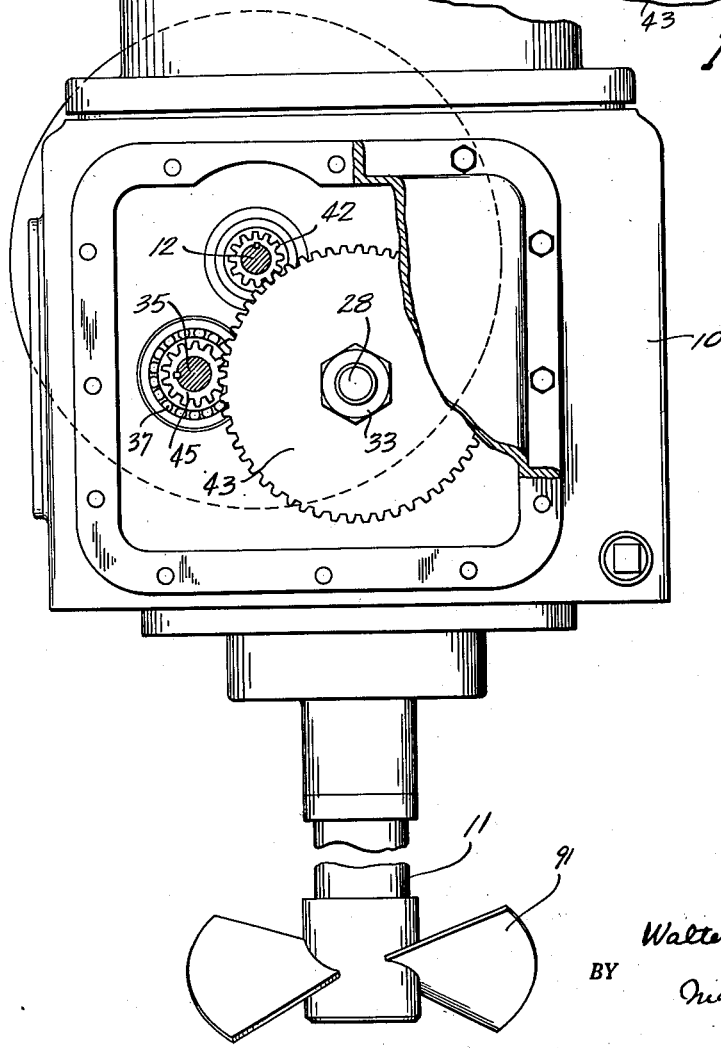
Fig. 4 is a detailed elevation view of the transmission, parts being broken away and parts being shown in section and showing the triple reduction arrangement.

For holding the shaft 12 in its adjusted positions a spacer sleeve 57 is mounted on said shaft between the gear 42 and the nut 19 and is mounted in a ball bearing journal 58 whose outer race is secured to a shiftable sleeve 59 slidably mounted in a tubular guide 60 formed in the housing 10. The tube 60 has manually releaseable diametrically disposed spring pressed locking pins 61 mounted therein adapted to engage in sets of locking recesses or holes 62 and 63 connected by key slots 62a in the sleeve 58. The pins 61, carry hand knobs 64 for moving them outwardly to a release position against the pressure of the springs 65. When the pins 61 register with the holes 62 as shown in Fig. 5, the shaft 12 is locked in its double reduction position, and when said pins register with the holes 63 as shown in Fig. 6, the shaft 12 is locked in its triple reduction position. Thus, for a double reduction, the operator releases the pins 61 and pushes the shaft 12 toward the left to the position shown in Fig. 5 bringing the change gear 42 into mesh with the change gear 43 for the first reduction, the meshing gears 25 and 27 providing the second reduction. For the triple reduction, the operator releases the pins 61 and pulls the shaft 12 toward the right to the position shown in Fig. 6 bringing the pinion 17 into mesh with the gear 44 for the first reduction and securing the second reduction through the change gears 42 and 45, and the third reduction through the gears 25 and 27. Referring to Figs. 7 and 8, instead of shifting the shaft 12 to secure the selective reductions, the change gears 42 and 45 are separately shifted. These Figs. 7 and 8 are developed sections to facilitate showing of the parts. Actually the shaft 12 occupies the same position above the shafts 35 and 28 as is shown in Figs. 3 and 4.

For shifting the gear 42 its hub 66 is slidably splined to the splined end 67 of the shaft 12 and is detachably connected to a nut 68 by mounting its recessed outer end in a recess 69 in said nut and securing it for free rotation therein by set screws 70 in said nut engaged in the recess 71 in said hub. The nut 68 engages the threaded end 72 of the shaft 12 and is turned relative thereto by a spanner wrench engageable in one of the spanner holes 73 on said nut so that turning of the nut on the shaft 12 will move the gear 42 longitudinally of the shaft out of and into meshing relation with the gear 43 to effect the double reduction. The nut 68 may be locked in its two extreme positions of adjustment by a lock bolt 74 engageable in one of the bores 75 in the nut and mountable in the threaded opening 76 of a wheel 77.

A similar arrangement to that just described is provided for shifting the gear 45 out and into mesh with the gear 43 for the triple reduction. The hub of the gear 45 is slidably splined to the splined end 78 of the shaft 35 whose outer end 79 is threaded to take the nut 80 and has the wheel 81 keyed thereto. The nut 80 is identical with the nut 68 and carries the set screws 82 engaging in the annular recess 83 of the hub of the gear 45 to hold said gear in the recessed end 84 of said nut. The nut 80 is turnable by a spanner wrench engageable with the wrench holes 85 and is locked in position by a lock bolt 86 engageable in one of the bores 87 of the nut and mountable in the threaded bore 88 of the wheel 81. For changing the gears 42, 45, and 43 the housing plate 90 is detached from the main housing, thus exposing the gear 43 for changing and also exposing the inner ends of the nuts 68 and 80 with their set screws 70 and 82 so that on loosening these set screws the gears 42 and 45 may be changed to accommodate the substituted change gear 43 and then the housing plate 90 is replaced, bringing the gears 42 and 45 into alined position relative to the shafts 12 and 35 with which said gears are associated. In this form of the invention the shaft 12 is in continual driving engagement with the shaft 35 through the gears 17 and 44 so that the shaft 35 rotates continuously, but its drive to the shaft 28 is only effective when the gear 45 meshes with the gear 43. Fig. 7 shows the relationship of gears for the triple reduction drive to the shaft 22 and Fig. 8 their relationship for the double reduction in which the gears 43 and 42 are actually in mesh. Figs. 7 and 8 also show the nuts 68 and 80 as working in oil seals 89 in the removable housing plate 90. Fig. 3 shows the gear 42 meshing with the gear 43 for double reduction while Fig. 4 shows the gears 17 and 44 in mesh and the gears 45 and 43 in mesh for triple reduction for either form. The shaft 11 or 22 may be used to drive various devices such as an agitator 91.

It is to be understood that the invention is not to be limited to the details of construction above described except in so far as such limitations are included in the claims.

What I claim as my invention is:

1. In a transmission mechanism, the combination of a housing, a driven shaft journalled in said housing, a countershaft journalled in said housing and having a reducing gear drive connection with said driven shaft and with its axis at right angles to that of said driven shaft, a drive shaft journalled in said housing parallel to said countershaft and at one side of said driven shaft, a second countershaft journalled in said housing parallel to said drive shaft, said drive shaft and said countershafts having parts extended from said housing, intermeshable gears for said countershafts and said drive shaft, the gear on said second countershaft and the gear on said drive shaft being separately shiftable into mesh with the gear on said first countershaft, means for shifting the gear on said drive shaft into meshing engagement with the gear on said first countershaft for a second reduction, means for shifting the gear on said second countershaft into meshing engagement with the gear on said first countershaft for a third reduction, there being a gear on said drive shaft constantly meshing with a gear on said countershaft and operative for said third reduction, and means for holding each shiftable gear in intermeshing relation with its associated gear.

2. The structure as defined in claim 1 wherein each means for separately shifting the gear on said drive and the gear on said second countershaft, respectively, comprise a nut connected with shiftable gear and in threaded engagement with the shaft on which the shiftable gear is mounted, and the holding means is a lock bolt anchored to the shaft carrying the shiftable gear and engageable with said nut.

3. The structure as defined in claim 1 wherein gears on the extended ends of said drive and countershafts are change gears and are mounted in an auxiliary housing detachably secured to the main housing, the shifting means for each shiftable gear is mounted in said auxiliary housing and the shiftable change gears are detachably connected to their respective shifting means and removable from their shafts on the removal of said auxiliary housing.

4. In a power transmission, the combination of a housing, a drive shaft, a countershaft, a second countershaft, said shafts being journalled in said housing in substantially parallel radially spaced relation, a driven shaft journalled in said housing at substantially right angles to said shafts, speed reduction gearing connecting said second countershaft to said driven shaft, a speed reduction gear train for interconnecting said drive shaft and said countershafts to provide a double speed reduction between said drive shaft and said second countershaft, said gear train including gears axially movable to drivingly connect said drive shaft to said second countershaft independently of said other countershaft to thereby provide a single speed reduction between said drive shaft and said second countershaft, and means for detachably mounting certain of the gears of said gear train outside of said housing so as to render the same readily removable and replaceable by gears of other sizes to thereby further vary the speed ratio between said drive shaft and said second countershaft, whereby said driven shaft may be driven at any of a large number of selected speeds throughout a wide range.

5. The structure as defined in claim 4 wherein one of said movable gears is carried by and axially movable with one of said shafts.

6. The structure as defined in claim 4 wherein one of said shafts is axially movable and said movable gears are axially movable therewith.

7. The structure as defined in claim 4 wherein said drive shaft is axially movable and said movable gears are carried by and axially movable therewith.

8. The structure as defined in claim 4 wherein said movable gears are axially movable independently of said shafts.

9. In a power transmission, the combination of a housing, three shafts journalled therein in substantially parallel radially spaced relation, a speed reduction gear train for drivingly connecting two of said shafts through the third of said shafts to provide a double speed reduction therebetween, said gear train including gears axially moveable to connect said two shafts independently of said third shaft so as to provide a single speed reduction therebetween, and means for detachably mounting certain of the gears in said train outside of said housing so as to render the same readily removable and replaceable by gears of other sizes to further vary the speed ratio between said shafts.

10. The structure as defined in claim 9 wherein one of said movable gears is carried by and axially movable with one of said shafts.

11. The structure as defined in claim 9 wherein one of said shafts is axially movable and said movable gears are axially movable therewith.

12. The structure as defined in claim 9 wherein said drive shaft is axially movable and said movable gears are carried by and axially movable therewith.

13. The structure as defined in claim 9 wherein said movable gears are axially movable independently of said shafts.

WALTER P. SCHMITTER.

REFERENCES CITED

The following references are of record in the file of this patent:

UNITED STATES PATENTS

| Number | Name | Date |
|---|---|---|
| 972,672 | Abbott | Oct. 11, 1910 |
| 1,041,615 | Gehricke | Oct. 15, 1912 |
| 1,063,874 | Hall | June 3, 1913 |
| 1,378,228 | Hartman | May 17, 1921 |
| 1,734,406 | Strand | Nov. 5, 1929 |
| 1,780,578 | Christy | Nov. 4, 1930 |
| 2,197,361 | Gordon | Apr. 16, 1940 |

FOREIGN PATENTS

| Number | Country | Date |
|---|---|---|
| 168,602 | Switzerland | Apr. 15, 1934 |
| 591,298 | Germany | Jan. 18, 1934 |
| 688,164 | Germany | Feb. 14, 1940 |
| 824,823 | France | Feb. 17, 1938 |